(12) United States Patent
Raasakka

(10) Patent No.: US 6,508,507 B2
(45) Date of Patent: Jan. 21, 2003

(54) ROLL-UP SUNROOF SHADE

(75) Inventor: John Raasakka, Howell, MI (US)

(73) Assignee: Meritor Light Vehicle Technology, LLC, Troy, MI (US)

( * ) Notice: Subject to any disclaimer, the term of this patent is extended or adjusted under 35 U.S.C. 154(b) by 0 days.

(21) Appl. No.: 09/858,314

(22) Filed: May 15, 2001

(65) Prior Publication Data

US 2002/0171264 A1 Nov. 21, 2002

(51) Int. Cl.$^7$ ................................................. B60J 7/00
(52) U.S. Cl. ....................................................... 296/214
(58) Field of Search ................................ 296/214, 219, 296/218

(56) References Cited

U.S. PATENT DOCUMENTS 4,925,238 A  *  5/1990  Thaler ........................ 296/218
4,978,165 A  * 12/1990  Schreiter et al. ........ 296/214 X

FOREIGN PATENT DOCUMENTS

| DE | 3417983 | * 11/1985 | ................ 296/214 |
| JP | 258213 | * 10/1988 | ................ 296/214 |
| JP | 263133 | * 10/1988 | ................ 296/214 |
| JP | 269719 | * 11/1988 | ................ 296/214 |

* cited by examiner

*Primary Examiner*—Dennis H. Pedder
(74) *Attorney, Agent, or Firm*—Carlson, Gaskey & Olds

(57) ABSTRACT

A vehicle sunroof assembly is provided including a roof with a sunroof opening. A headliner is arranged adjacent to the roof in the vehicle occupant area. A track assembly is disposed between the roof and the headliner. The track assembly, which preferably supports the sunroof, includes lateral spaced apart guide members. A sunshade receptacle is arranged between the guide members, preferably in a lateral location near the side of the vehicle where it may accommodate the sunshade without adversely affecting headroom. A flexible sunshade is supported by the guide members and is moveable between open and closed position along the guide members with the sunshade blocking at least a portion of the opening in the closed position. The sunshade is received in the sunshade receptacle in the open position. Preferably, the flexible sunshade is constructed from a plurality of rigid members that are secured to spaced apart flexible layers.

16 Claims, 2 Drawing Sheets

ROLL-UP SUNROOF SHADE

BACKGROUND OF THE INVENTION

This invention relates to a sunroof assembly for a vehicle, more particularly, the invention relates to a sunroof sunshade.

Sunroofs are desirable features to many vehicle consumers. The sunroof is typically located over an occupant seating area, and as a result, may affect the available headroom to the occupants. Sunroofs typically move forward to rearward between closed and open positions. The sunroof may be stored in the open position on the exterior of the vehicle, or alternatively, the sunroof may be stowed between the roof and headliner, which reduces the headroom to the vehicle occupants. Most commonly sunroofs are stowed between the roof and headliner thereby reducing headroom.

Sunshades are commonly used with vehicle sunroofs to block sunlight when the sunroof is in the closed position. Sunshades are commonly stowed between the roof and headliner, further reducing the available headroom to the occupants. If sufficient headroom is unavailable to the occupants, the sunshade may be eliminated or expensive alternatives may be required to accommodate the sunshade. Accordingly, when the sunroof and/or sunshade is stowed in a closed position, which is typically within the vehicle compartment between the roof and headliner, the headroom is reduced. Therefore, what is needed is a vehicle sunroof assembly that includes a sunshade that minimizes the negative impact on headroom when the sunshade is in a stowed position.

SUMMARY OF THE INVENTION AND ADVANTAGES

The present invention provides a vehicle sunroof assembly including a roof with a sunroof opening. A headliner is arranged adjacent to the roof in the vehicle occupant area. A track assembly is disposed between the roof and the headliner. The track assembly, which preferably supports the sunroof, includes lateral spaced apart guide members. A sunshade receptacle is arranged between the guide members, preferably in a lateral location near the side of the vehicle where it may be packaged without adversely affecting headroom. A flexible sunshade is supported by the guide members and is moveable between open and closed position along the guide members with the sunshade blocking at least a portion of the opening in the closed position. The sunshade is received in the sunshade receptacle in the open position. Preferably, the flexible sunshade is constructed from a plurality of rigid members that are secured to spaced apart flexible layers.

Accordingly, the above invention provides a vehicle sunroof assembly that includes a sunshade that minimizes the negative impact on headroom when the sunshade is in a stowed position.

BRIEF DESCRIPTION OF THE DRAWINGS

Other advantages of the present invention can be understood by reference to the following detailed description when considered in connection with the accompanying drawings wherein.

DETAILED DESCRIPTION OF THE PREFERRED EMBODIMENT

Figure 1:
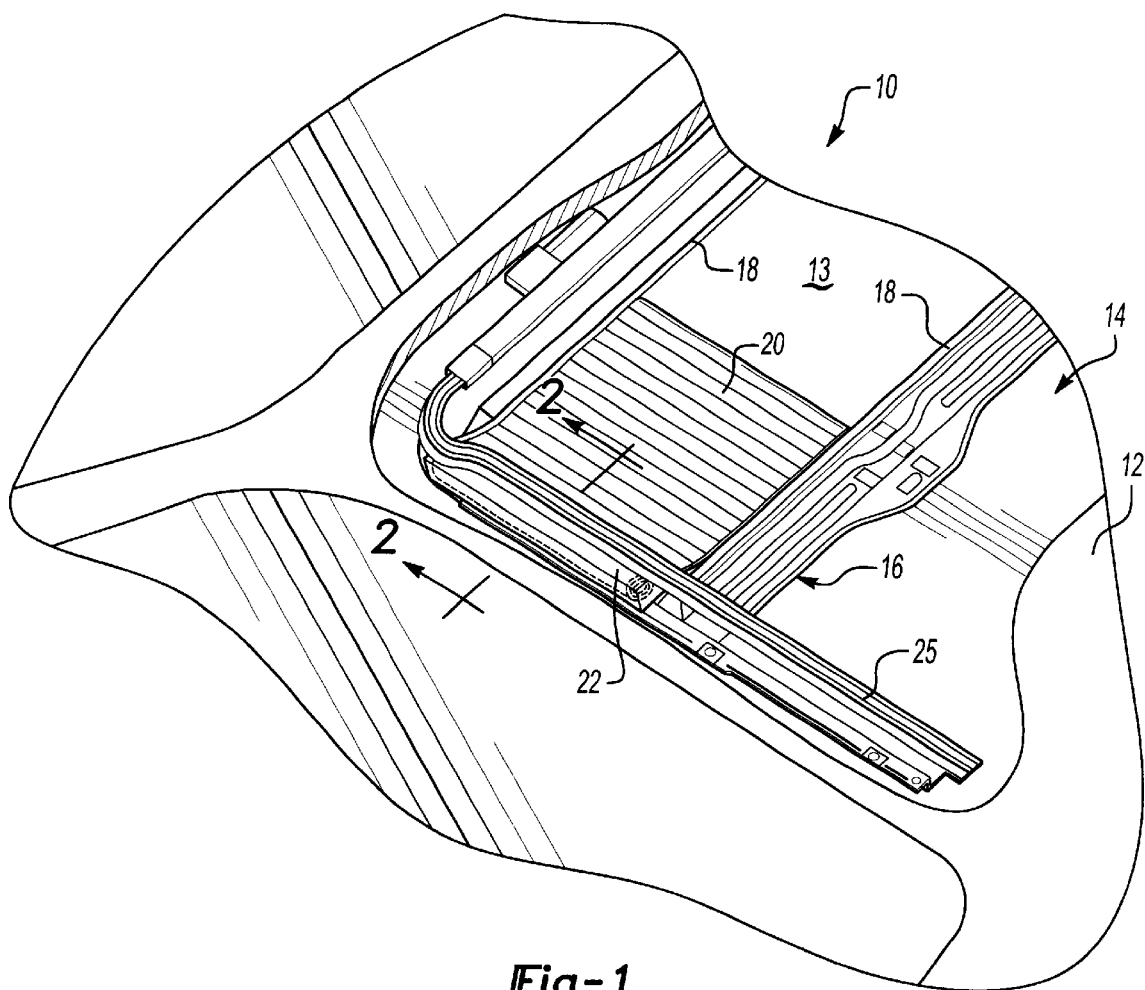
FIG. 1 is a partial perspective view of a top of a vehicle with the roof partially broken away.
Figure 2:
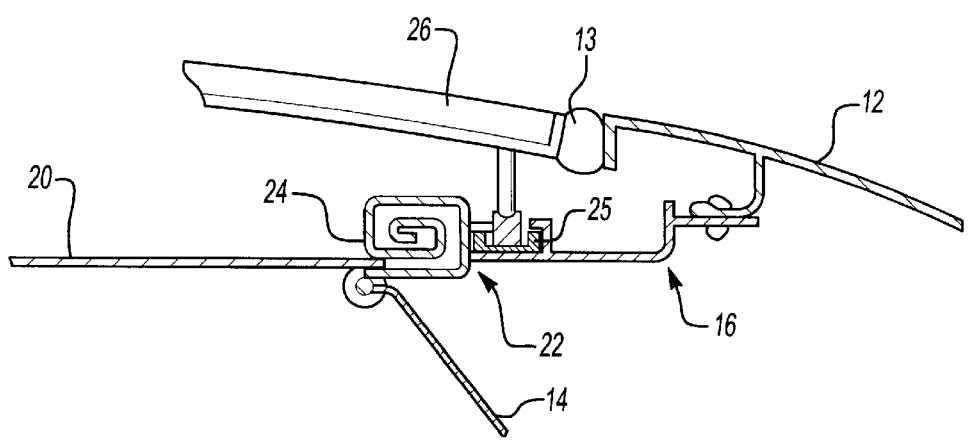
FIG. 2 is a cross sectional view of a sunroof assembly shown in FIG. 1 taken along lines 2—2.

A top of a vehicle is shown in FIG. 1. The vehicle includes a sunroof assembly 10, secured to a roof 12. The sunroof assembly 10 is primarily disposed between the roof 12 and a headliner 14 within the interior of the vehicle. An opening 13 is arranged in the roof 12 for receiving a sunroof The sunroof assembly 10 includes a track assembly 16 having guide members 18 arranged laterally. That is, the guide members 18 extend in a side-to-side direction relative to the vehicle. Referring to FIGS. 1 and 2, a flexible sunshade 20 is supported by the guide members 18 for movement between open and closed positions. Preferably, a pair of sunshades 20 are used in the sunroof assembly 10. When in the closed position, the sunshades meet in the center of the opening 13.

With prior art devices, single rigid panels have been utilized as sunshades and have been moved from a forward position in which the sunshade covers the opening 13 to a rearward position in which the opening 13 is unobstructed by the sunshade. However, such arrangements typically impinge upon vehicle occupant headroom. To this end, the flexible sunshade 20 is arranged for movement in a lateral direction toward the side of the vehicle where the sunroof 20 may be stowed without adversely affecting headroom. The sunroof assembly 10 includes a sunshade receptacle 22 arranged between the guide members 18 for receiving the sunshade 20.

The receptacle is located laterally at the side of the vehicle where it may be packaged without adversely affecting headroom. The receptacle 22 includes a channel 24 which receives and guides the sunshade 20 when in the closed position. The channel 24 overlaps or double backs on itself, preferably numerous times, to minimize the space required for storage of the sunshade 20.

The track assembly 16 preferably includes sunroom tracks 25 arranged transverse, preferably perpendicular, to the guide members 18. A sunroof 26 moves along the tracks 25 between forward and rearward positions corresponding to closed and open positions, as is known in the prior art. In this manner, the track assembly 16 provides a modular unit by which the sunshade 20 and sunroof 26 may be installed onto the vehicle.

Figure 3:
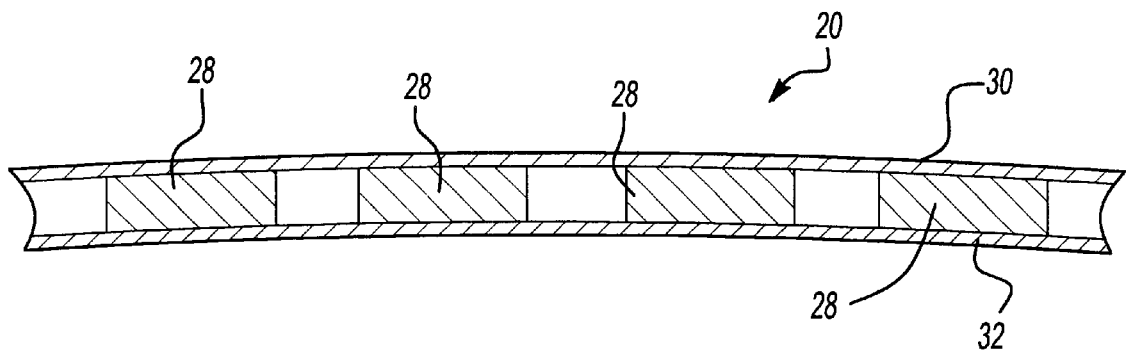
FIG. 3 is an enlarged cross sectional view of the sunshade shown in FIG. 2.

Referring now to FIG. 3, an enlarged cross-sectional view of the sunshade 20 is shown. The sunshade includes a plurality of rigid members 28 arranged generally parallel to one another. The rigid members 28 are sandwiched between and secured to first 30 and second 32 layers. Preferably, the layers are constructed from an aesthetically pleasing fabric. The rigid members 28 preferably provide sufficient structural integrity to the sunshade 20 comparable to a prior art single panel sunshades. However, the flexible nature of the sunshade 20 permits the sunshade to be stowed in a compact manner within the receptacle 20 to the side of the interior of the vehicle where the negative impact on headroom is minimized.

Figure 4:
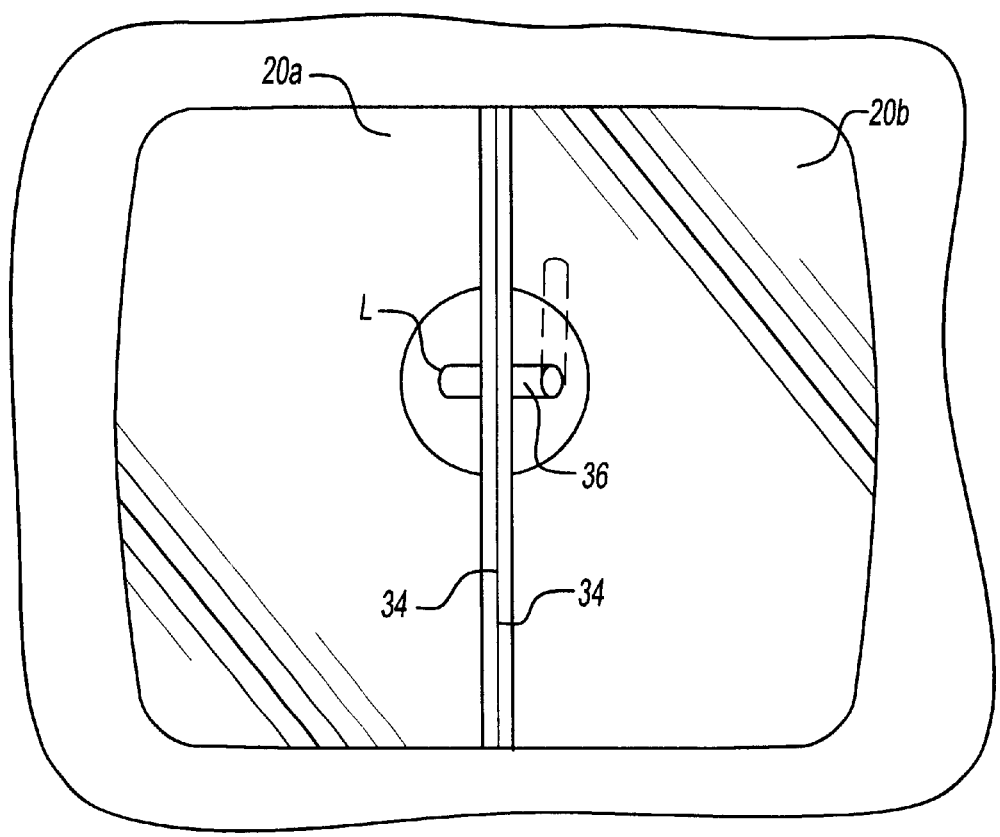
FIG. 4 is an enlarged bottom elevational view of opposing sunshades in a closed position.

Opposing sunshades 20a and 20b are shown in a closed position in FIG. 4. The sunshades 20a and 20b include ends 34 arranged in abutting relationship to one another. A latch 36 may be used to secure the sunshades 20a and 20b to one another. The latch 36 may include a handle, as shown, that may be moved to a locked position L, or any other suitable device. The sunshades 20*a* and 20*b* may be moved manually independently of one another, or may be actuated simultaneously or independently by a motorized mechanism.

The invention has been described in an illustrative manner, and it is to be understood that the terminology that has been used is intended to be in the nature of words of description rather than of limitation. Obviously, many modifications and variations of the present invention are possible in light of the above teachings. It is, therefore, to be understood that within the scope of the appended claims the invention may be practiced otherwise than as specifically described.

What is claimed is:

1. A vehicle sunroof assembly comprising:
    a roof with a sunroof opening;
    a headliner adjacent to said roof;
    a track assembly disposed between said roof and said headliner, said track assembly including lateral spaced apart guide members and a sunshade receptacle arranged between said guide members;
    a flexible sunshade supported in said guide members and movable between open and closed positions along said guide members, said sunshade blocking at least a portion of said opening in said closed position and being received in said sunshade receptacle in said open position; and
    a pair of opposing sunshades with ends of said sunshades meeting one another in said closed position.

2. The vehicle sunroof assembly according to claim 1, wherein said sunshade receptacle includes a channel in overlapping relation with itself.

3. The vehicle sunroof assembly according to claim 1, further including a latch having a locked position for securing said sunshades in said closed position.

4. The vehicle sunroof assembly according to claim 1, wherein said sunshades are movable independently relative to one another.

5. The vehicle sunroof assembly according to claim 1, wherein said sunshade includes a flexible layer and a plurality of generally parallel rigid members secured to said flexible layer.

6. The vehicle sunroof assembly according to claim 5, wherein said sunshade includes a second flexible layer opposite said flexible layer with said rigid members secured to said second layer.

7. The vehicle sunroof assembly according to claim 1, wherein said track assembly includes sunroof tracks transverse to said guides and a sunroof supported in by said sunroof tracks.

8. The vehicle sunroof assembly according to claim 5, wherein said plurality of generally parallel rigid members are supported by said lateral spaced apart guide members.

9. A vehicle sunroof assembly comprising:
    lateral spaced apart guide members generally parallel to one another;
    a sunshade receptacle arranged between and generally perpendicular to said guide members; and
    a flexible sunshade supported in said guide members and movable between open and closed positions along said guide members, said received in said sunshade receptacle in said open position; and
    a pair of opposing sunshades with ends of said sunshades meeting one another in said closed position.

10. The vehicle sunroof assembly according to claim 9, wherein said sunshade receptacle includes a channel in overlapping relation with itself.

11. The vehicle sunroof assembly according to claim 9, further including a latch having a locked position for securing said sunshades in said closed position.

12. The vehicle sunroof assembly according to claim 9, wherein said sunshades are movable independently relative to one another.

13. The vehicle sunroof assembly according to claim 9, wherein said sunshade includes a flexible layer and a plurality of generally parallel rigid members secured to said flexible layer.

14. The vehicle sunroof assembly according to claim 13, wherein said sunshade includes a second flexible layer opposite said flexible layer with said rigid members secured to said second layer.

15. The vehicle sunroof assembly according to claim 9, wherein said assembly includes sunroof tracks transverse to said guide members and a sunroof supported in by said sunroof tracks.

16. The vehicle sunroof assembly according to claim 13, wherein said plurality of generally parallel rigid members are supported by said lateral spaced apart guide members.

* * * * *

UNITED STATES PATENT AND TRADEMARK OFFICE
CERTIFICATE OF CORRECTION

PATENT NO. : 6,508,507 B2
DATED : January 21, 2003
INVENTOR(S) : Raasakka

It is certified that error appears in the above-identified patent and that said Letters Patent is hereby corrected as shown below:

Column 4,
Line 17, before "received" insert -- sunshade --

Signed and Sealed this

Seventeenth Day of June, 2003

JAMES E. ROGAN
*Director of the United States Patent and Trademark Office*